United States Patent [19]

MacMillan

[11] 4,028,029
[45] June 7, 1977

[54] RETREADING MOLD WITH BLADDER FOR CREATING ANNULAR VACUUM GAP

[76] Inventor: Kenneth T. MacMillan, 4992 Wesleyan Woods Drive, Macon, Ga. 31204

[22] Filed: Aug. 20, 1976

[21] Appl. No.: 716,206

Related U.S. Application Data

[63] Continuation-in-part of Ser. No. 391,816, Aug. 27, 1973, Pat. No. 3,997,284.

[52] U.S. Cl. .................................. 425/23; 425/36; 425/43; 425/52; 425/58
[51] Int. Cl.² ............................................. B29H 5/04
[58] Field of Search ................. 425/17, 19, 20, 21, 425/22, 23, 24, 25, 33, 36, 43, 49, 50, 51, 52, 58, 812

[56] References Cited

UNITED STATES PATENTS

| | | | |
|---|---|---|---|
| 2,695,424 | 11/1954 | Madison et al. | 425/50 X |
| 2,791,805 | 5/1957 | White | 425/23 |
| 2,835,921 | 5/1958 | White | 425/22 |
| 3,170,195 | 2/1965 | Knox | 425/33 X |
| 3,676,028 | 7/1972 | Christie et al. | 425/36 X |
| 3,701,615 | 10/1972 | Johnson | 425/23 |
| 3,989,429 | 11/1976 | Mattson | 425/52 |

Primary Examiner—J. Howard Flint, Jr.
Attorney, Agent, or Firm—Diller, Brown, Ramik & Wight

[57] ABSTRACT

This disclosure relates to retread molds adapted for manual, semi-automatic or full automatic operation and specifically is directed to a pair of relatively movable platens carrying matrix means for receiving a tire therein with bead aligner wheels associated therewith, the bead aligner wheels being in axially opposed relationship to each other, an annular bladder disposed between the platens, the annular bladder having innermost peripheral marginal portions, the marginal portions being in overlying relationship upon the bead aligner wheels, and means for creating an annular gap between a terminal edge of each bladder peripheral marginal portion, an outboard portion of each of the bladder peripheral margins and the associated bead aligner wheel, the annular gap creating means being defined by an annular bead carried by each outboard portion and/or terminal end of each bladder peripheral marginal portion in sealing contact with its associated bead aligner wheel.

6 Claims, 12 Drawing Figures

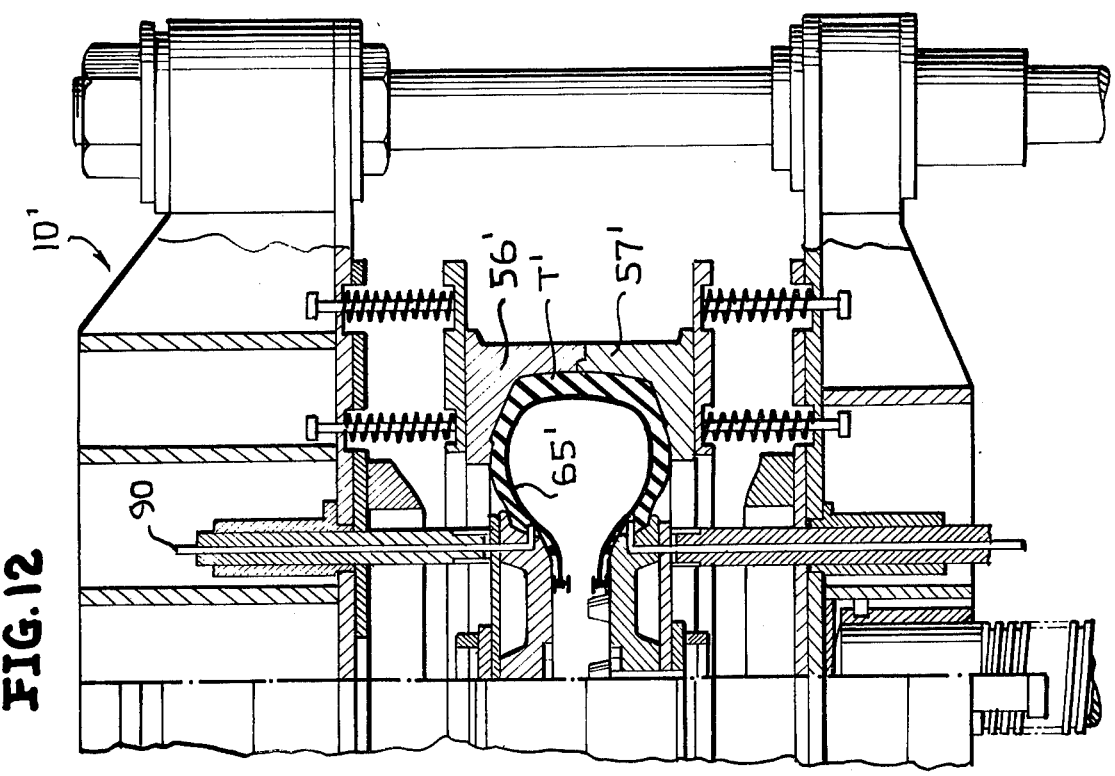
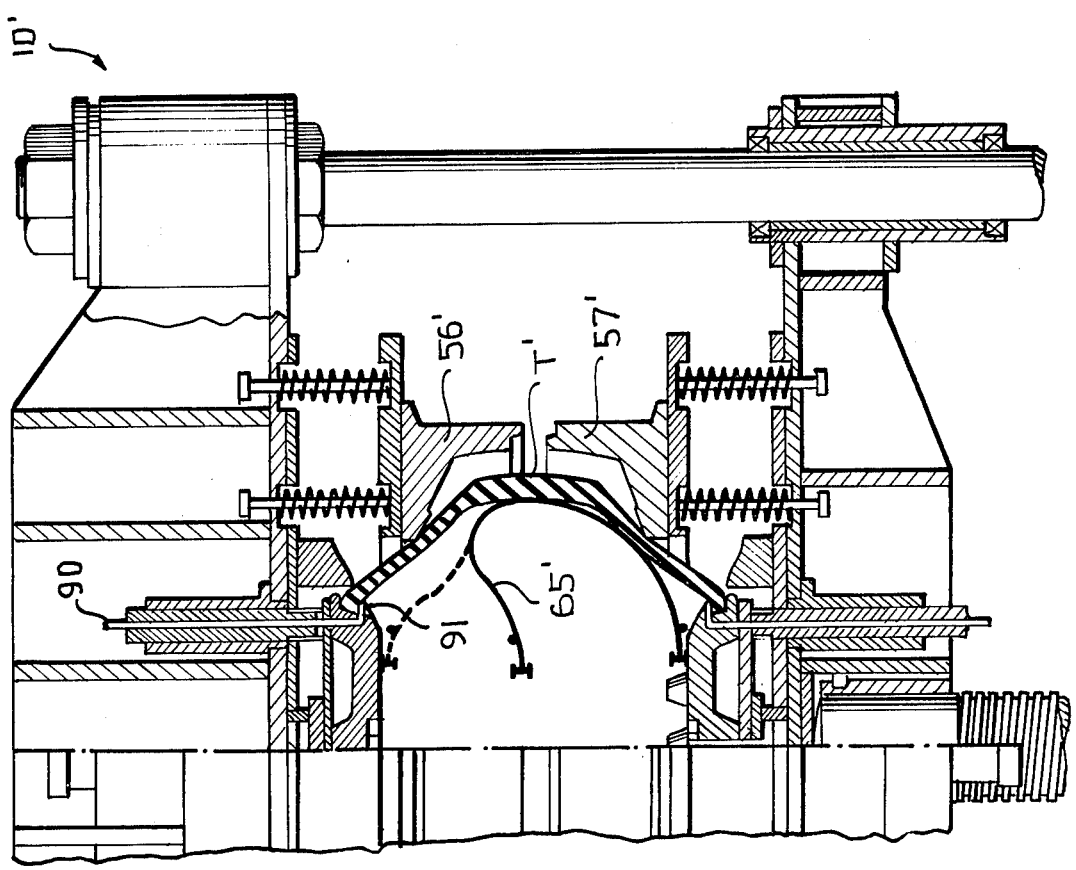

RETREADING MOLD WITH BLADDER FOR CREATING ANNULAR VACUUM GAP

The present application is a continuation-in-part of application Ser. No. 391,816 filed Aug. 27, 1973 in the name of Kenneth T. MacMillan being entitled AUTOMATIC PRODUCTION MOLDS, and now issued as U.S. Pat. No. 3,997,284.

A primary object of this invention is to provide a novel retreading mold which includes a pair of relatively movable platens, matrix means carried by each platen for receiving therein a tire to be retreaded, a bead aligner wheel associated with each platen, the bead aligner wheels being in axially opposed relationship to each other, an annular bladder disposed between the platens, the annular bladder having innermost peripheral marginal portions, the marginal portions being in overlying relationship upon the bead aligner wheels, means for creating an annular gap between a terminal edge of each bladder peripheral marginal portion and its associated bead aligner wheel, and the annular gap being created by an annular bead carried by a terminal end portion and/or an outboard portion of each bladder peripheral marginal portion in sealing contact with its associated bead aligner wheel.

A further object of this invention is to provide a retreading mold of the type heretofore defined wherein any of the aforementioned annular beads carried by the marginal portions of the bladder are directed axially oppositely of each other.

Another object of this invention is to provide a novel retreading mold of the type heretofore set forth including means for inflating the interior of the bladder to create a partial vaccum within each of the annular gaps.

Still another object of this invention is to provide a novel retread mold of the type heretofore defined including means for moving the bead aligner wheels away from each other while the annular gap is under partial vacuum, means for relatively moving the platens toward each other to close the matrices while the bead aligner wheels are spaced from each other, and means for moving the bead aligner wheels toward each other after the matrices are closed.

Another object of this invention is to provide means for clamping beads of the tire to the bead aligner wheels.

With the above and other objects in view that will hereinafter appear, the nature of the invention will be more clearly understood by reference to the following detailed description, the appended claims and the several views illustrated in the accompanying drawings.

IN THE DRAWINGS

FIG. 11 is a fragmentary elevational view partially in section of a modification of the machine of FIGS. 1–3, and illustrates the manner in which the diameter of a tire is foreshortened by being mechanically clamped to the bead aligner wheels in lieu of or in conjunction with the vacuum clamping to be described hereinafter with respect to the machine of FIGS. 1–3.

FIG. 12 is a sectional view identical to FIG. 11 but illustrating the matrices in their closed position.

Figure 1:
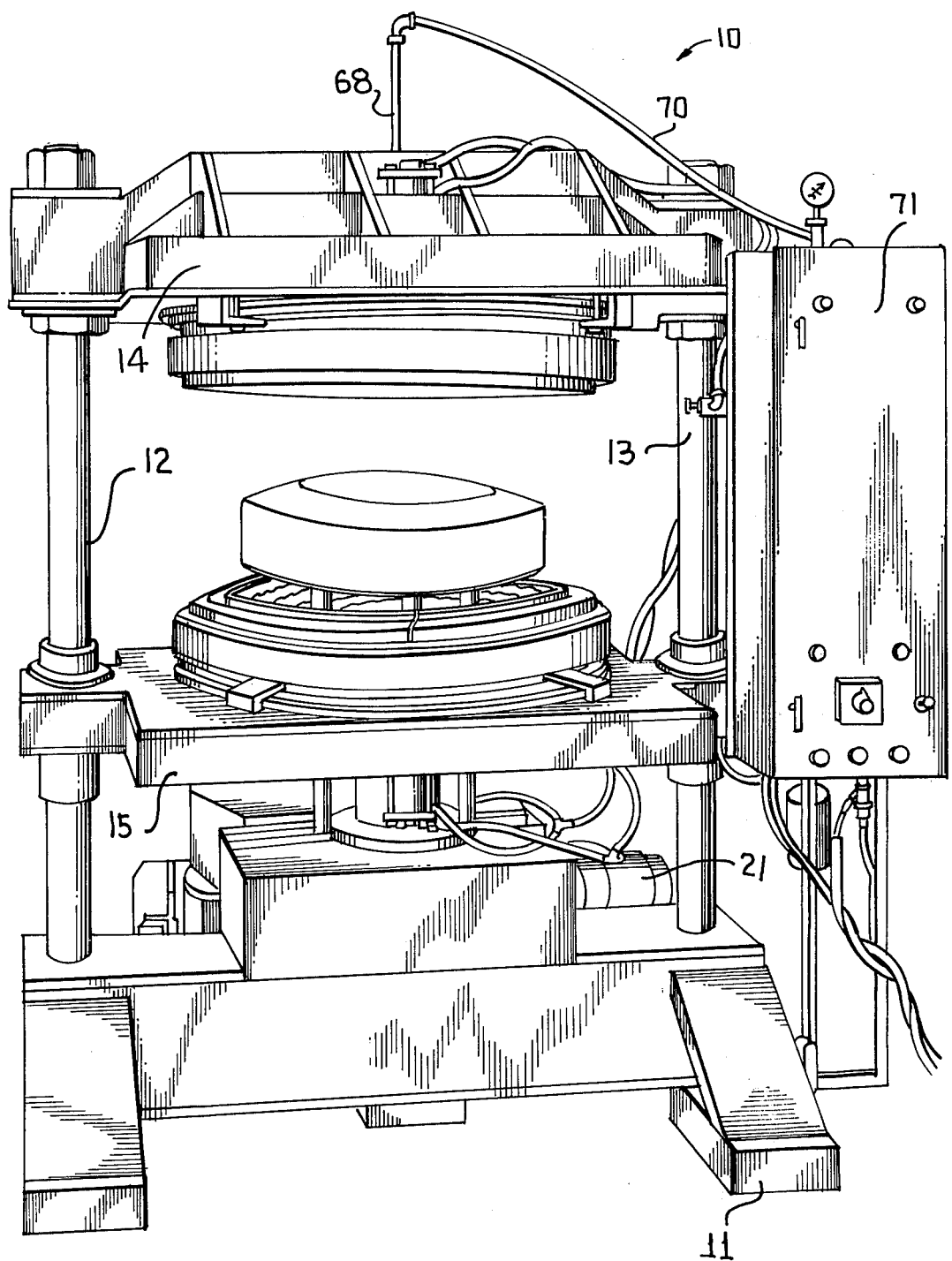
FIG. 1 is a perspective front view of a novel automatic retreading machine constructed in accordance with this invention, and illustrates a pair of platens in the open position thereof carrying segmented matrices with a tire located upon a lower bead aligner wheel.
Figure 2:
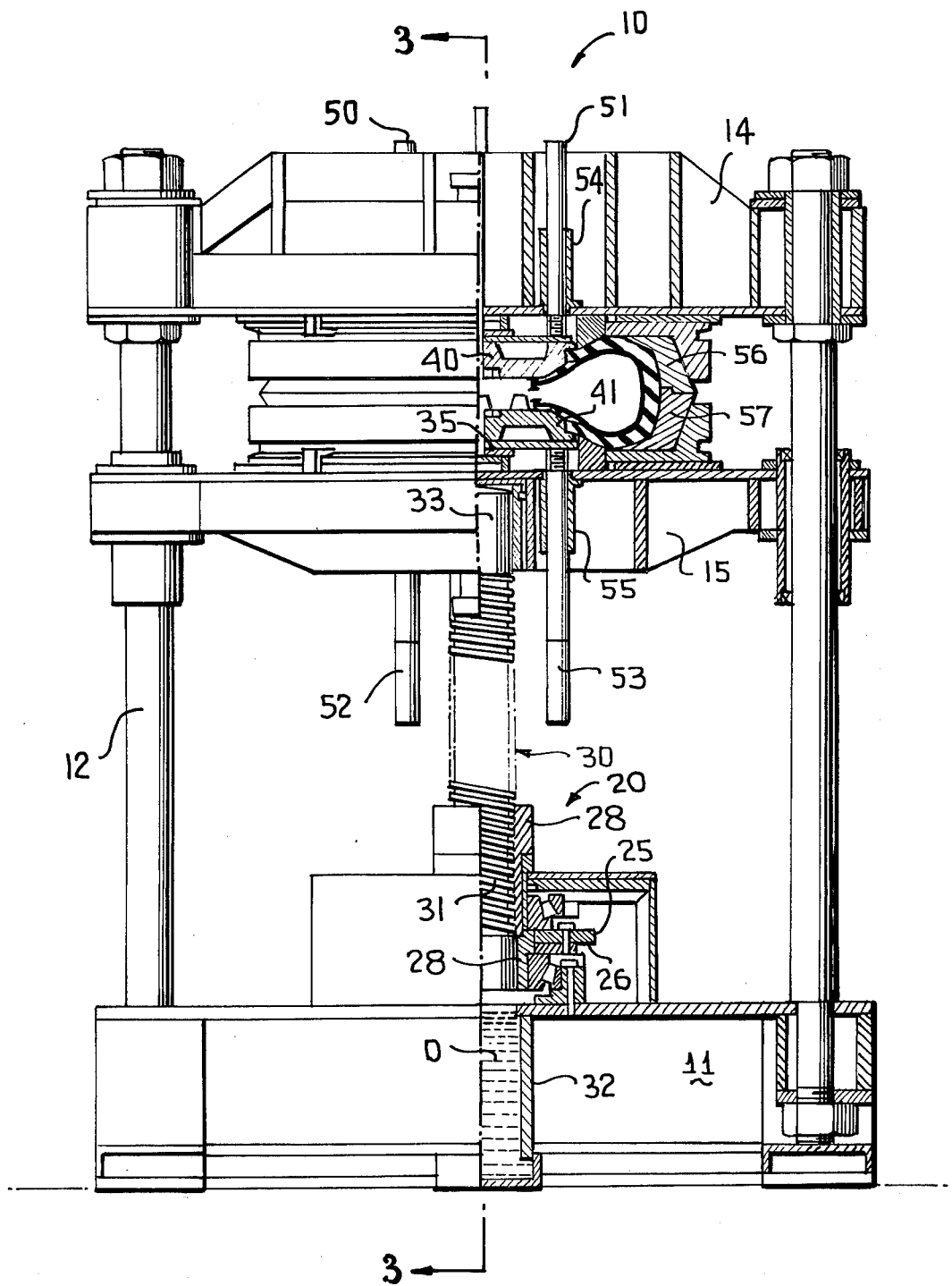
FIG. 2 is a front elevational view of the machine of FIG. 1 partially in cross section, and illustrates the matrices closed and a bladder under pressure maintaining a tire to be retreaded in conformity with the interior of the matrices.
Figure 3:
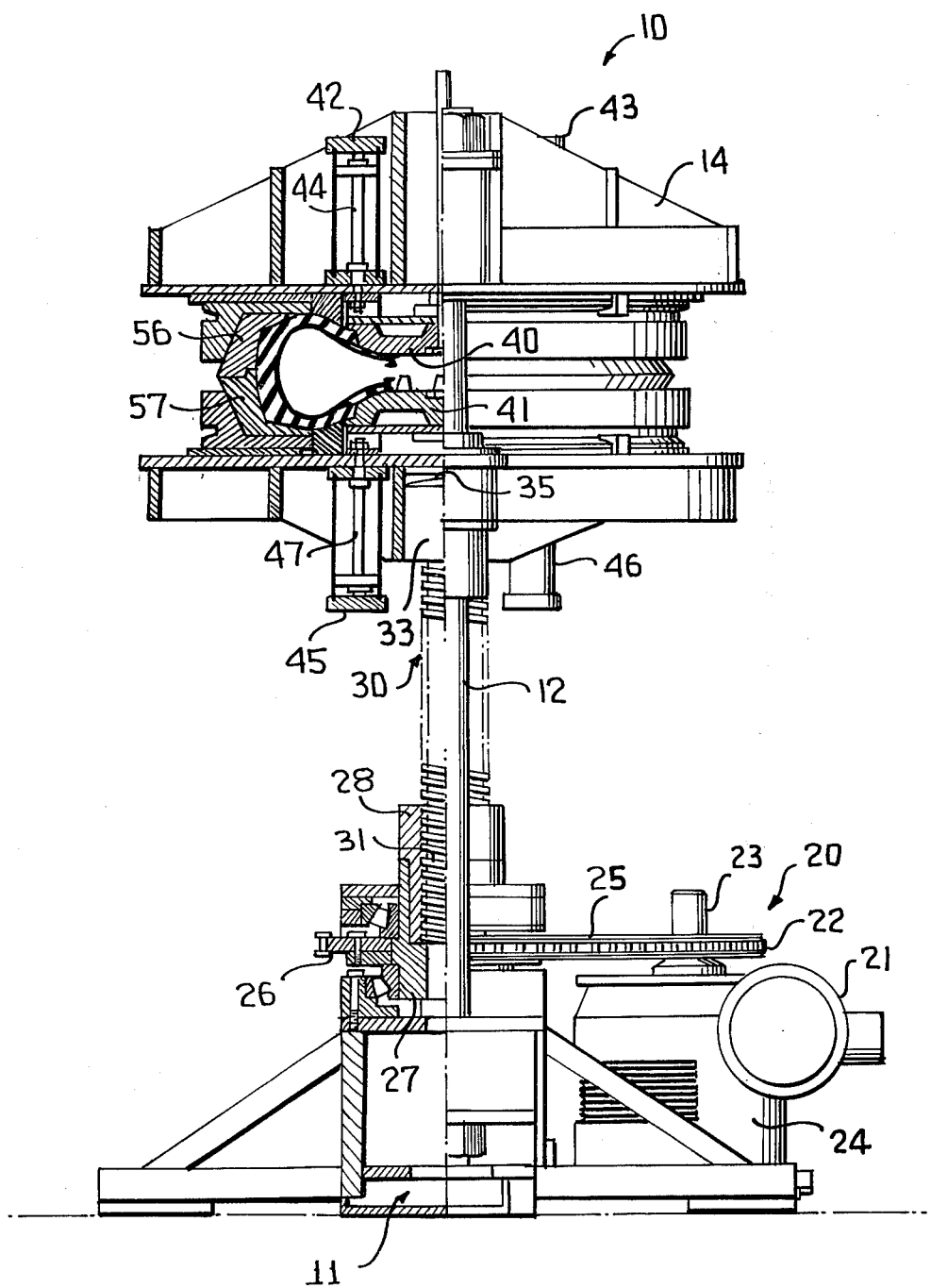
FIG. 3 is a cross-sectional view taken generally along line 3—3 of FIG. 2, and particularly illustrates means for imparting motion to the bead aligner wheels and the drive for relatively moving the platens carrying the matrices relative to each other.

Reference is first specifically made to a machine 10 of FIGS. 1 through 3 which includes a conventional base 11 which has secured thereto in a conventional manner a pair of upstanding cylindrical supports 12, 13. An upper platen 14 is fixedly secured to an upper end portion (unnumbered) of the supports, 12, 13 by nuts (unnumbered) in the manner readily apparent from the upper right hand portion of FIG. 2. The upper end portions (unnumbered) of the supports 12, 13 are, of course, threaded to receive the nuts and the latter may be adjusted or threaded to achieve alignment between the upper fixed platen 14 and a lower movable platen 15.

The movable platen 15 is provided with conventional bushings (unnumbered) which surround the supports 12, 13 and thus the platen 15 may be readily moved between the open position (FIG. 1) thereof and the closed position illustrated in FIG. 2.

Means for imparting relative movement between the platens 14, 15 is generally designated by the reference numeral 20 and includes an electric motor 21 connected to a suitable electrical source (not shown) which drives a sprocket 22 keyed to an output shaft 23 of a gear reducer 24. A drive chain 25 is entrained about the sprocket 22 and about a sprocket 26 (FIG. 2) suitably secured to a tubular stub shaft 27 which in turn is welded or otherwise secured to an internally threaded nut 28. A reciprocal member 30 in the form of a screw is threaded within the nut 28 in the manner readily apparent from FIGS. 2 and 3. A lower end portion 31 of the screw 30 is capable of descending into a suitable lubricant, such as oil O, maintained within a generally cylindrical reservoir or sump 32. Accordingly, upon the ascent of the screw 30 the oil deposited upon the end portion 31 will maintain the threads (unnumbered) of the nut 28 continuously lubricated during the reciprocal motion imparted to the platen 15.

An upper end portion 33 of the screw 30 is provided with means, generally designated by the reference numeral 35, for achieving self-centering between the platen 15 and the platen 14. The means 35 is simply a convex surface on the end portion 33 of the screw 30 which bears against a planar (unnumbered) surface of the platen 15. Thus, if there is any misalignment of a minor nature between the platens 14, 15 and the matrices associated therewith to be described more fully hereinafter the platen 15 will tilt or cock as need be to an extent permitted by the bushings (unnumbered) associated with the supports 12, 13 thus assuring alignment between the matrices and the tire therein. Furthermore, the platen 15 through of a relatively rigid construction can still flex somewhat under the force applied thereto by the screw 30 and this in turn achieves a self-adjusting or self-centering between the platens 14, 15 and the matrices carried thereby.

An upper bead aligner wheel 40 and a lower bead aligner wheel 41 (FIGS. 2, 3 and 10) are reciprocally carried by the respective platens 14, 15 and are mounted thereon for relative reciprocal movement toward and away from each other in a conventional manner. More specifically, a pair of fluid motors 42, 43 carried by the upper platen 14 include identical pistons 44 (only one of which is illustrated in FIG 3) which are secured to the upper bead aligner wheel 40 for imparting motion thereto in a conventional manner. Likewise, fluid motors 45, 46 carried by the lower platen 15 include piston rods 47 (only one of which is illustrated) for reciprocating the bead aligner wheel 41 in the manner readily apparent from FIG. 3.

During the reciprocal motion imparted to the bead aligner wheels 40, 41 guidance is provided by guide rods 50, 51 secured to the bead aligner wheel 40 and by guide rods 52, 53 (FIG. 2) secured to the bead aligner wheel 41. The rods 50, 51 and 52, 53 are slideably received in tubular guides 54, 55, respectively, (only one of each being shown in FIG. 2) carried by the respective platens 14, 15.

Conventional segmented matrices 56, 57 are carried by the platens 14, 15 and are operative in the manner described in commonly assigned abandoned U.S. application Ser. No. 287,826 in the name of Kenneth T. MacMillan in favor of which was filed a Rule 60 Continuation Application under Ser. No. 514,486 filed Oct. 15, 1974 which was in turn abandoned in favor of another Rule 60 Continuation Application filed Apr. 16, 1975 under Ser. No. 568,738, which was in turn abandoned in favor of application Ser. No. 643,648 filed Dec. 23, 1975. Though specifically utilizing segmented matrices 56, 57 the machine 10 may be modified in the manner to be described hereinafter in order that the same can utilize "full" or nonsegmented circular matrices.

Figure 9:
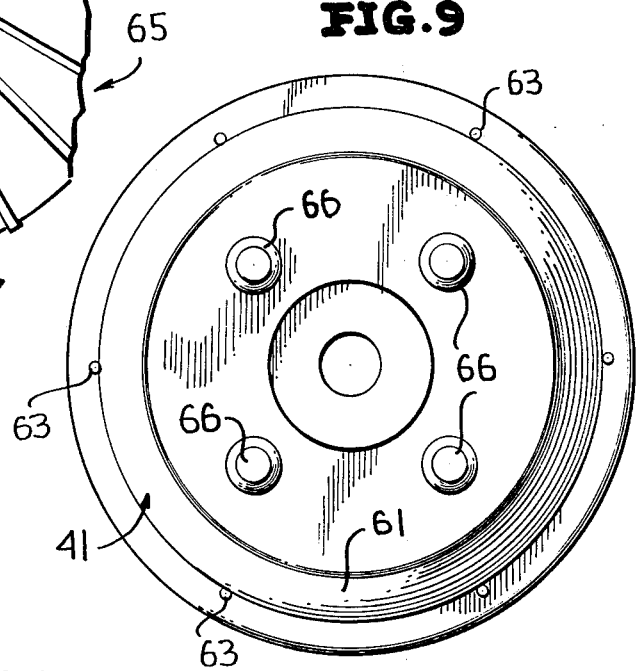
FIG. 9 is a view looking axially at one of the pair of bead aligner wheels of this invention, and illustrates a smooth uninterrupted surface thereof.
Figure 10:
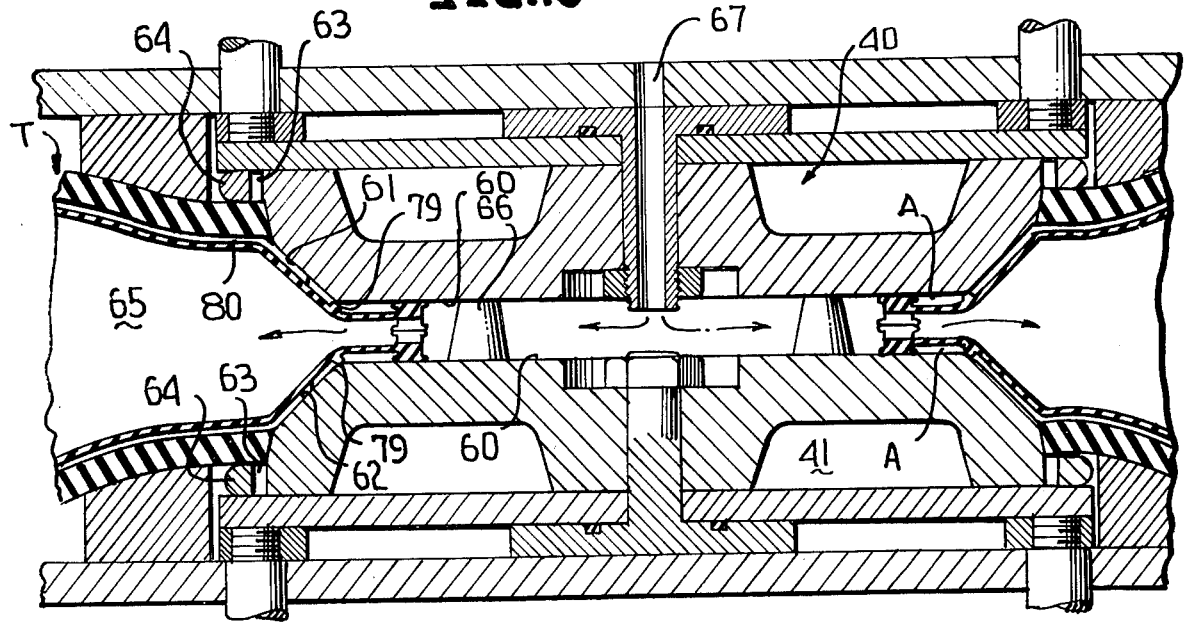
FIG. 10 is an axial sectional view taken through a pair of the bead aligner wheels of the invention, and illustrates the manner in which an annular gap under partial vacuum is created between each bladder marginal edge portion and its associated bead aligner wheel.

Reference is now made specifically to FIG. 10 which illustrates the bead aligner wheels 40, 41 in more specific detail. Since the bead aligner wheels 40, 41 are essentially of an identical construction like reference numerals have been applied thereto. The bead aligner wheels 40, 41 each include opposing sealing surfaces 60, 60 which are essentially normal to the axis of the bead aligner wheels 40, 41 and to the axis of the screw 30. Radially outboard of each of the sealing surfaces 60, 60 is an annular smooth uninterrupted sealing surface 61, 61 (FIGS. 9 and 10) each of which is cooperative with a bladder 65 in a manner to be described more fully hereinafter. Radially outboard of each surface 61, 61 is a plurality of bleed openings 63 formed in a flange 64. The openings or bores 63 cooperate with the bladder 65 in a manner to be described more fully hereinafter to bleed entrapped air from between an exterior surface of the bladder 65 and an interior surface of a tire T between the matrices 56, 57 to atmosphere during the pressurization of the interior of the bladder 65.

It is mandatory to preclude the bladder 65 from being pinched during the closing of the matrices 56, 57 as well as during the closing of the bead aligner wheels 40, 41, and accordingly one or both of the bead aligner wheels 40, 41 are provided with a plurality of axially projecting bosses 66 (FIG. 9). In the embodiment of the invention illustrated the bead aligner wheel 41 has four such bosses 66 and during the closing of the bead aligner wheels 40, 41 the bosses 66 contact the sealing surface 60 of the bead aligner wheel 40 and assur that the bladder disposed therebetween will not be pinched. The bosses 66 are also preferably disposed with their axis on a common circle such that they also serve as means for locating the bladder upon the bead aligner wheels 40, 41 as will be described more fully hereinafter.

Inasmuch as it is necessary in keeping with the invention to inflate the bladder 65 a pressurized fluid, which is preferably heated air, is introduced into the space between the sealing surfaces 60, 60 of the bead aligner wheels 40, 41 through a port 67 which is in turn connected by a pipe 68, (FIG. 1) and a flexible conduit 70 to a suitable source (not shown) of pressurized fluid as, for example, hot air or a heated, non-explosive, noncompressible liquid or a source of steam or the like. Suitable conventional control means within a control panel 71 (FIG. 1) are provided for maintaining pressure internally of the bladder 65 at a desired level and suitable means may be provided for circulating the fluid media within the bladder 65. An an alternative, the fluid media need not be heated nor circulated within the bladder 65 and instead may be utilized simply to inflate the bladder 65 to a desired pressure with the heat required for the curing operation being achieved by conventionally heating the matrices 56, 57 electrically or by the circulation of a heating fluid therethrough.

Figure 6:
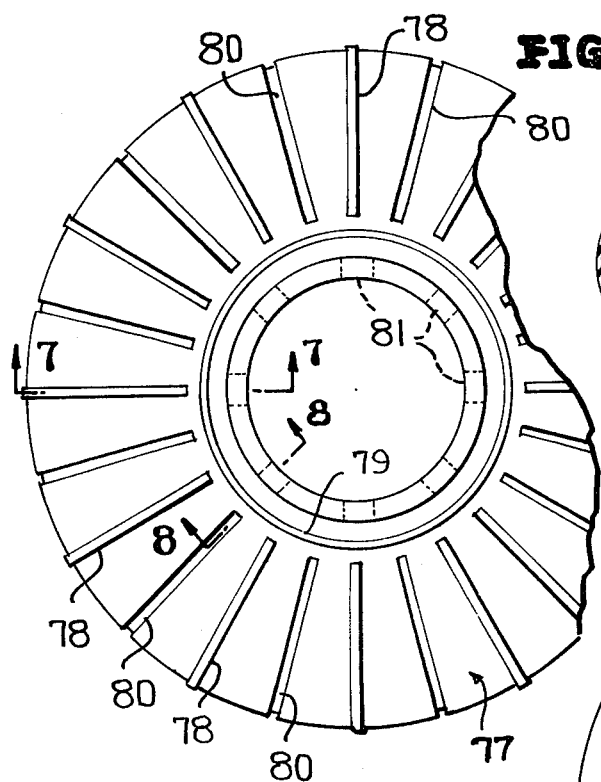
FIG. 6 is a fragmentary top plan view of the bladder associated with the machine of FIGS. 1 through 3, and illustrates radial ribs and grooves upon an exterior surface of the bladder along with two concentric annular ribs which with the bead aligner wheels define a pair of annular vacuum gaps.
Figure 7:
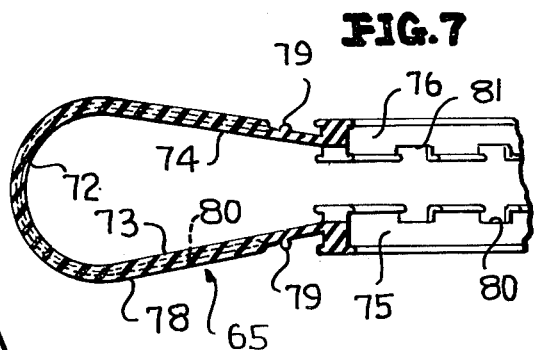
FIG. 7 is a sectional view taken generally along line 7—7 of FIG. 6, and more fully illustrates the beads above the exterior surface of the bladder and notches in opposing surfaces of one of the beads defining means for permitting the introduction of fluid into and the removal of fluid from the bladder interior.
Figure 8:
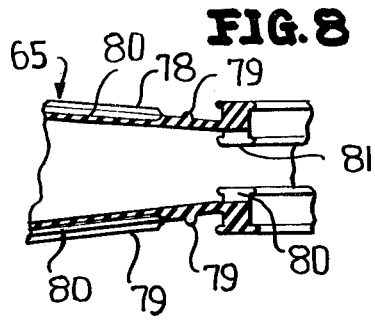
FIG. 8 is a fragmentary enlarged cross-sectional view taken along line 8—8 of FIG. 6, and more fully illustrates the manner in which the notches of radially innermost bladder beads are in axial alignment.

Reference is now made specifically to FIGS. 6–8 of the drawings which more specifically illustrates the bladder 65 as a generally annular member of a U-shaped cross section (FIG. 7) defined by a bight portion 72 and a pair of arms or legs 73, 74 terminating in inboardmost terminal edges or beads 75, 76, respectively. The cross-sectional thickness of the legs 73, 74 is thickest adjacent the beads 75, 76 and tapers progressively radially outwardly to a thinner though generally uniform cross-sectional thickness in the area of the bight portion 72. This tapering permits the bight portion 72 to conform to the interior configuration of the tire prior to outward progressive confirmation of the legs 73, 74 against the inner surface of the tire sidewalls, as will be described more fully hereinafter. An exterior surface 77 of the bladder 65 includes a plurality of radially directed raised ribs 78 between which are radial grooves 80 which serve as bleed or venting passages for air entrapped between the inner surface of the tire sidewall and the exterior surface 77 of the bladder 65 in conjunction with the bleed openings 63 of the bead aligner wheels 40, 41. In otherwords, as the bladder 65 is being inflated (FIG. 10) the bight portion 72 thereof begins to progressively conform to the inner surface of the crown (unnumbered) of the tire T and in doing so air therebetween is forced toward the tire beads (unnumbered). Air which would otherwise be thus entrapped is expelled through the openings 63 at least some or all of which are aligned with the grooves 80 and ribs 78 of the bladder 65 resulting in the passage of this air to atmosphere through the bleed openings 63. An annular bead 79 is carried by each marginal portion of the bladder 65 outboard of the ribs or beads 75, 76 and slightly radially inboard of the ribs 78 and grooves or notches 80. The ribs or beads 75, 76 and 79 define an annular gap A under partial vacuum in a manner and for a purpose to be defined hereinafter.

Upon the introduction of fluid into the bladder 65, in the manner indicated by the unnumbered headed arrows in FIG. 10, the aligned notches 80, 81 define port means for the introduction of pressurizing fluid into the badder 65, as well as the exhausting therefrom.

A highly important feature of this invention is the manner in which annular chambers A (FIG. 10) are formed between the sealing surfaces 60, 61 of the bead aligner wheels 40, 41 and the ribs or beads 74, 75 and 79 of the bladder 65. The significance of this feature is more specifically applicable to full circle matrices, as opposed to segmented matrices. In the former the normal diameter of the tire T must be foreshortened in order that the full circle matrices may be closed without closing upon the tire T and/or assuring that the tire will be subsequently exapanded from its foreshortened condition to seat properly within the full circle matrices. In order to fully appreciate this reference is now made to FIGS. 4 and 5 of the drawings.

Figure 4:
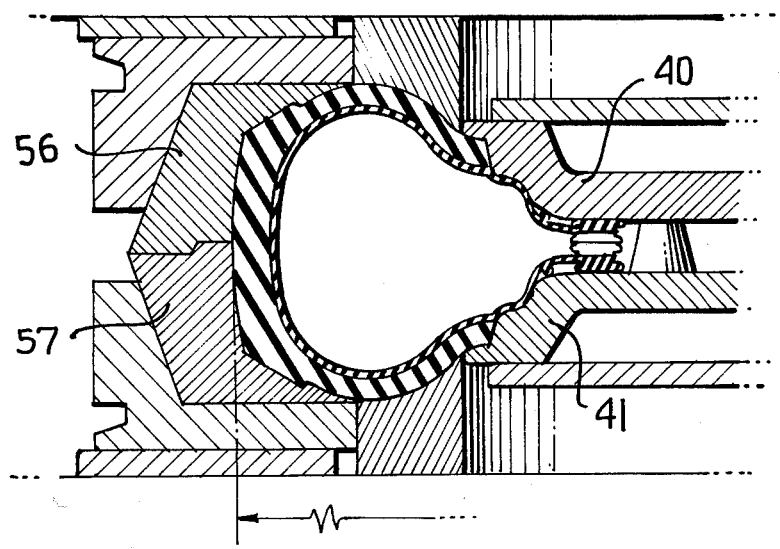
FIG. 4 is a fragmentary enlarged sectional view of a tire positioned within the closed matrices.
Figure 5:
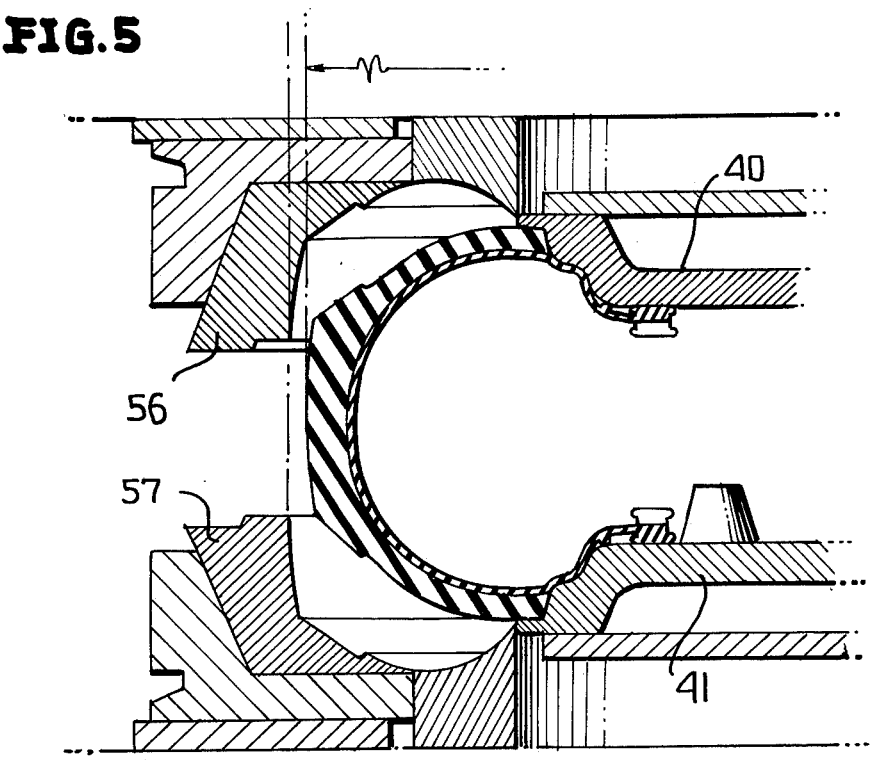
FIG. 5 is a fragmentary enlarged sectional view of a tire positioned within the opened matrices, and particularly illustrates the manner in which a partial vacuum retains the tire beads against the bead aligner wheels.

In FIG. 4 the matrices 56, 57 are shown closed and the inner surfaces thereof are in perfect conformity with the exterior of the tire T. The bladder 65 is, of course, pressurized at this point and due to the pressurization thereof which is greater than atmosphere the annular channels or gaps A are actually under a partial vacuum and therefore the beads 75, 76 and 79 are in hermetic sealing relationship with the surfaces 60, 61 of the bead aligner wheels 40, 41 and a tight hermetic seal is achieved between the surfaces 60, 61 of the bead aligner wheels 40, 41 and the beads 75, 76 and 79 of the bladder 65. Therefore, upon the opening of the matrices, the partial vacuum within the annular chambers A holds the marginal portions of the bladder tightly against the bead aligner wheels 40, 41. Accordingly, as the bead aligner wheels 40, 41 move away from each other the diameter of the tire T is foreshortened (FIG. 5) thereby permitting the matrices 56, 57 to be fully closed prior to the movement of the bead aligner wheels 40, 41 toward each other to achieve the positive seating between the tire T and the matrices, as shown in FIG. 4. Thus the built-up tire may be positioned in the manner shown in FIG. 5 and when the bladder is pressurized it will assume the position shown in this same figure. Thereafter and with the bead aligner wheels 40, 41 spread apart the full circle matrices are closed and thereafter the bead aligner wheels may be moved to the closed position of FIG. 4 incident to the performance of the curing operation.

Another machine 10' constructed in accordance with this invention is illustrated in FIGS. 11, 12 and components thereof corresponding to those of the machine 10 of FIGS. 1 through 3 bear like reference numerals, though the same have been primed. In keeping with the construction of the machine 10 the same as matrices 56', 57', but these are full circle matrices, not segmented. As compared to the machine 10 the machine 10' utilizes the concept of foreshortening a tire T' prior to the closing of the matrices, but the beads thereof are mechanically gripped in the manner illustrated in FIG. 11. The mechanism includes a plurality of rods 90 passing through suitable guide bores (unnumbered) and terminating in angular ends 91. The opposite ends of the rods 90 are rotated and reciprocated by conventional apparatus.

The tire T' is inserted between the matrices 56', 57' when the latter and the platens 14', 15' are in their fully opened positions after which the bead aligner wheels 40', 41' are moved toward each other and the beads (unnumbered) of the tire T' are automatically located. Thereafter the rods 90 are rotated from an out of the way position to the position shown in FIG. 11, and the bead aligner wheels 40', 41' are retracted to the illustrated position of FIG. 11. The bladder 65' is then inserted in the manner illustrated in FIG. 11 after which the full circle matrices 56', 57' are closed. Once the latter are closed the bead aligner wheels 40', 41' then move toward each other to their final position (FIG. 12) and fluid is introduced into the bladder 65' to pressurize the interior sufficiently depending, of course, upon the cure time, temperature, tire compound, etc. involved.

The machines 10 and 10' are provided with suitable control means including, of course, the control cabinet 71 and the components thereof which, for the most part, are conventional. However, in keeping with this invention the circuitry for the motor 21 includes a switch (not shown) carried by either of the platens 14, 15 such that upon the closing of the latter the switch will be activated to deenergize the motor 21. Preferably the switch actuates through a trip relay of a conventional construction on which the amperage may be adjusted to automatically shut off the drive motor 21 when the matrices 56, 57 or 56', 57' come together with sufficient force. When the motor 21 shuts off a conventional break automatically locks, although the latter is not an absolute requirement of the system. However, due to the adjustable nature of the relay it is unnecessary to adjust the distance between the platens at any time even if the matrices are changed or when spacers are inserted in a conventional manner, and this also makes the machines 10, 10' self-adjusting.

While preferred forms and arrangements of parts have been shown in illustrating the invention, it is to be clearly understood that various changes in details and arrangement of parts may be made without departing from the scope and spirit of this disclosure.

I claim:

1. A retreading mold comprising a pair of relatively movable platens, matrix means carried by each platen for receiving therein a tire to be retreaded, a bead aligner wheel associated with each platen, said bead aligner wheels being in axially opposed relationship to each other, each bead aligner wheel having means at a periphery for contacting a wheel bead and aligning a tire relative thereto, an annular bladder disposed between said platens, said annular bladder having innermost peripheral marginal portions, said innermost peripheral marginal portions being in overlying relationship upon said bead aligner wheels inboard of said contacting means; means for creating an annular gap between a terminal edge of each bladder peripheral marginal portion, an outboard portion of each said bladder peripheral marginal portion, and the associated bead aligner wheel, said annular gap creating means being defined by an annular axially projecting bead carried by each outboard portion of each said bladder peripheral marginal portions in sealing contact with its associated head aligner wheel, and each annular bead being positioned between said contacting means and said terminal edge.

2. The retreading mold as defined in claim 1 wherein said annular gap creating means is further defined by an annular axially projecting bead carried by each terminal edge in sealing contact with its associated bead aligner wheel inboard of the annular sealing contact created by said first-mentioned annular bead.

3. The retreading mold as defined in claim 1 wherein each said bead aligner wheels includes a surface upon which an associated marginal portion of said bladder overlies, and each said surface is smooth and uninterrupted.

4. The retreading mold as defined in claim 2 wherein each said bead aligner wheels includes a surface upon which an associated marginal portion overlies, and each said surface is smooth and uninterrupted.

5. The retreading mold as defined in claim 1 including means for clamping beads of the tire to said bead aligner wheel.

6. The retreading mold as defined in claim 1 including means for inflating the interior of said bladder to create a partial vacuum within each of said annular gaps.

* * * * *